United States Patent [19]

Inui et al.

[11] 4,432,001

[45] Feb. 14, 1984

[54] HEAT-SENSITIVE RECORDING HEAD DRIVING METHOD

[75] Inventors: Toshiharu Inui; Haruhiko Moriguchi; Takashi Ohmori, all of Kanagawa, Japan

[73] Assignee: Fuji Xerox Co., Ltd., Kanagawa, Japan

[21] Appl. No.: 337,556

[22] Filed: Jan. 6, 1982

[30] Foreign Application Priority Data

Jan. 16, 1981 [JP] Japan .................................... 56-3774

[51] Int. Cl.³ .............................................. G01D 15/10

[52] U.S. Cl. ................................ 346/76 PH; 219/216

[58] Field of Search ............................ 346/1.1, 76 PH; 400/120; 219/216 PH

[56] References Cited

U.S. PATENT DOCUMENTS 3,483,356 12/1969 Kalt ............................ 346/76 PH X 3,984,844 10/1976 Tanno et al. ............. 219/216 PH X

FOREIGN PATENT DOCUMENTS 54-139559 10/1979 Japan .................................. 400/120

55-164177 12/1980 Japan ............................. 346/76 PH

*Primary Examiner*—Donald A. Griffin

*Attorney, Agent, or Firm*—Sughrue, Mion, Zinn, Macpeak and Seas

[57] ABSTRACT

The heat-generating resistors in a heat-sensitive recording head are preheated, during the serial-to-parallel conversion of the video input signals and prior to the initiation of the recording cycle, to pre-heat the recording medium to a temperature 10° to 15° C. less than the temperature at which recording occurs, thereby reducing the minimum recording time required to produce a high density, high quality image on the recording medium.

4 Claims, 6 Drawing Figures

FIG. 1
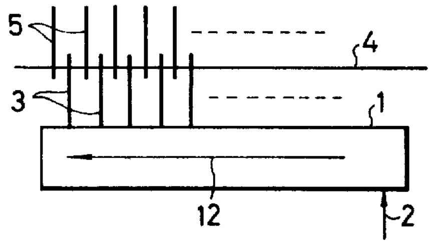
FIG. 3
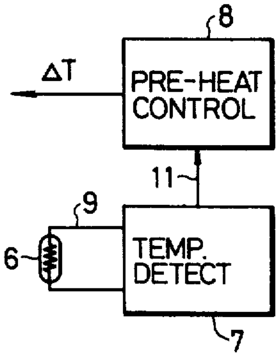
FIG. 2A
PRIOR ART
FIG. 2B
PRIOR ART
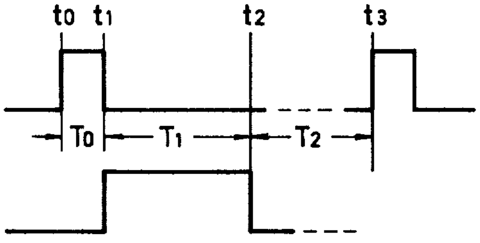
FIG. 4A
FIG. 4B
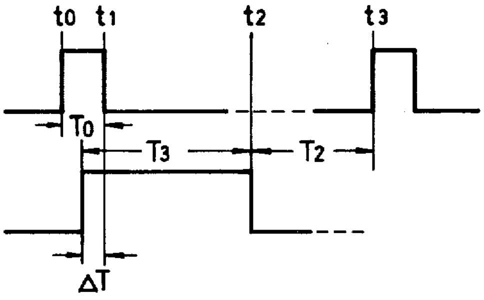

HEAT-SENSITIVE RECORDING HEAD DRIVING METHOD

BACKGROUND OF THE INVENTION

This invention relates generally to a method of driving the heat-sensitive head of a heat-sensitive recording apparatus and, more particularly, to such a method which increases the speed of thermal recording without reducing the quality and density of the recording or printing circuits.

In such a heat-sensitive recording apparatus, video signals for each scanning line which are supplied from a reading unit are employed to drive its heat-sensitive recording head to selectively cause the heat generating resistors to generate heat, so that the video signals are thermally recorded on a heat-sensitive recording sheet which is moved in the auxiliary scanning direction while being in contact with the heat generating resistors. The following patents and allowed patent application disclose heat-sensitive recording heads and apparatuses of this general type, and their disclosures are expressly incorporated herein by reference: U.S. Pat. Nos. 3,934,695, 4,032,925, 4,091,391, 4,113,391, 4,168,421 and 4,219,824; Ser. No. 127,690, filed Mar. 6, 1980.

FIG. 1 diagrammatically shows the recording section of a heat-sensitive recording device, which section drives a heat-sensitive recording head (not shown) with video signals set or stored in a shift register 1. The shift register 1 performs serial-to-parallel signal conversion. Serial video signals for one scanning line are supplied to the input 2 of shift register 1 during a set time interval $T_0$ extending from the time instant $t_0$ to the time instant $t_1$ as shown in FIG. 2A, and are set therein. The video signals thus set are applied, as video signals corresponding to picture elements, to respective lead wires 3 connected to the outputs of shift register 1. First ends of these lead wires 3 are electrically connected to a heat generating resistor 4 at predetermined intervals. First ends of lead wires 5 are also electrically connected to the heat generating resistor 4 at the same intervals as those mentioned above. However, it should be noted that the lead wires 3 and the lead wires 5 are staggered as shown in FIG. 1 so that the lead wires 3 and 5 do not overlap. Therefore, when a switching element (not shown) connected to the other ends of the lead wires 5 is turned on during the printing time interval $T_1$ extending from the time instant $t_1$, when the video signals 3 are set in the shift register 1, to the predetermined time instant $t_2$, earlier than the time instant $t_3$ when the next video signals are set in the shift register 1 (FIG. 2B), then a pair of lead wires 3 and 5 corresponding to a "black" video signal are supplied with current, as a result of which the corresponding portion of the heat generating resistor 4 generates heat to achieve the thermal recording operation.

During the time interval $T_2$ extending from the time instant $t_2$, when the recording or printing has been accomplished, to the time instant $t_3$, when video signals for the next line are set in the shift register, the heat-sensitive recording sheet (not shown) must be moved in the auxiliary scanning direction to the next line printing or recording position. Accordingly, it is impossible to reduce the time interval $T_2$ to any great extent. However, if the recording speed of the heat-sensitive recording apparatus is increased, i.e. if the recording time $(T_0+T_1+T_2)$ per line is reduced, then the printing time is also reduced. On the other hand, as the printing time is reduced, the amount of heat generated by each selected portion of the heat generating resistor 4 is also reduced. In order to compensate for this reduction in heat, a method of increasing the voltage applied to the heat-sensitive recording head has been employed in the art. However, the increase of the voltage is limited to a certain maximum value because of the durability of the heat-sensitive recording head and the design of the heat-sensitive recording head drive circuit, and, therefore, it is difficult for such a high speed heat-sensitive recording apparatus to produce a thermal recording with sufficiently high density and quality.

SUMMARY OF THE INVENTION

In view of the foregoing, an object of the invention is to provide an improved method of driving the heat-sensitive recording head of a heat-sensitive recording apparatus in which a parallel signal, obtained by subjecting serial video signals to serial-to-parallel signal conversion, is applied to the heat generating resistors of the heat-sensitive recording head, and the heat generating resistors are selectively caused to generate heat sufficient to effect recording; and in which method the heat generating resistors are preheated to a temperature lower than the heat generation start temperature necessary to effect a recording, thereby reducing the printing or recording time.

The foregoing object of the invention has been achieved by the provision of an improved method of driving the heat-sensitive recording head of a heat-sensitive recording apparatus, in which method, according to the invention, the heat generating resistors are caused, during the signal conversion, to generate heat for a predetermined period of time to preheat them by using the parallel signal which is outputted by a circuit adapted to subject input serial video signals to serial-to-parallel conversion.

BRIEF DESCRIPTION OF THE DRAWING

FIG. 1 is a schematic diagram showing the principle of the recording section of a heat-sensitive recording apparatus. FIGS. 2A and 2B are timing diagrams showing various waveforms which illustrate the conventional method of driving a heat-sensitive recording apparatus.

FIG. 3 is a block diagram showing a drive control section for a heat-sensitive recording heat according to one embodiment of this invention.

FIGS. 4A and 4B are timing diagrams showing various waveforms which illustrate the method of driving a heat-sensitive recording head according to the preferred embodiment of this invention.

DETAILED DESCRIPTION OF THE PREFERRED EMBODIMENT

This invention will be described with reference to its preferred embodiment.

FIG. 3 shows a drive control section for a heat-sensitive recording head. The drive control section comprises: a thermistor 6 mounted on the substrate of the heat-sensitive recording head; a temperature detecting circuit 7 for the substrate; and a pre-heating control circuit 8 for controlling the pre-heating of the heat-generating resistors of the heat-sensitive recording head. The temperature detecting circuit 7 detects the temperature of the heat-sensitive recording head substrate according to temperature data 9 from the thermistor 6 to provide a substrate temperature signal 11 which is applied to the pre-heating control circuit 8. The preheating control circuit 8 sets a pre-heating time $\Delta T$ according to the substrate temperature signal 11. The preheating time $\Delta T$ is set so that it is shorter than the set time $T_0$ and so that, when the heat generating resistor generates heat continuously for the preheating time, the recording sheet is preheated to a temperature lower by 10° to 15° C. than the heat generation start temperature at which thermal recording occurs.

FIG. 4 is a waveform diagram illustrating the improved method of driving the heat-sensitive recording head. It is assumed that the video signals of a given scanning line are set in the register 1 (FIG. 1) during the set time interval $T_0$ extending from the time instant $t_0$ to the time instant $t_1$ (FIG. 4A). The preheating control circuit 8 turns on a switching element (not shown) connected to the other ends of the lead wires 5 for a printing time interval $T_3$ (FIG. 4B) which extends from a time instant, earlier by the preheating time $\Delta T$ than the time instant $t_1$, to the time instant $t_2$. Therefore, when either the video signals for the preceding line stored in the shift register 1, or video signals newly stored therein, are shifted in the direction of the arrow 12 (FIG. 1), signals are applied to the lead wires 3 to cause the heat generating resistor 4 to generate heat, so that a recording sheet in contact with the heat generating resistor 4 is preheated for the initial preheating time $\Delta T$. Then, during the printing time $(T_3-\Delta T)$, the corresponding portions of the heat generating resistor are selectively caused to generate recording heat in accordance with the video signals set in the shift register 1; thus, the input video data are thermally recorded on the heat-sensitive recording sheet.

As is apparent from the above description, according to the invention, the thermal recording operation is carried out after the portion of the recording sheet where data should be recorded is preheated. Therefore, the printing time can be substantially reduced, thereby effecting an increase of the recording speed. Even if the heat-sensitive recording apparatus is located in a cold area or at a place where the environmental temperature is variable, the recording operation can be performed with uniform density by appropriately adjusting the preheating time $\Delta T$.

If the heat-sensitive recording head driving method described above should suffer from the problem that, when the recording is carried out for the first scanning line, the preheating operation is not sufficiently carried out because, in this case, no video signals are set in the shift register yet, then this problem can be eliminated by the procedure of writing "black" video signals for one line in the shift register when the power switch of the apparatus is turned on. However, since, as a practical matter, it is seldom required to record "black" video data in the first scan line, this procedure is not required very often.

We claim:

1. A method of driving the heat-sensitive recording head of a heat-sensitive recording apparatus in which the heat generating resistors of said heat-sensitive recording head are selectively caused to generate heat according to a parallel signal, which is obtained by subjecting serial video signals to serial-to-parallel conversion, so that said video signals are thermally recorded on a heat-sensitive recording sheet which is in contact with said heat generating resistors, characterized in that said heat generating resistors are caused to generate heat during the serial-to-parallel conversion by utilizing for a predetermined period of time the parallel signal which is outputted by a circuit adapted to subject the serial video signals to serial-parallel conversion, so that the part of said heat-sensitive recording sheet which is in contact with said heat generating resistors is preheated to a predetermined temperature lower than the heat generating start temperature at which recording occurs.

2. The method defined in claim 1 further characterized in that said predetermined temperature is 10° to 15° C. less than said heat generating start temperature.

3. The method defined in claim 1 further characterized in that said circuit is a shift register and said serial-to-parallel conversion occurs during an initial set time interval $T_0$, and that said predetermined period of time is a time interval $\Delta T$ less than, and within, said time interval $T_0$.

4. The method defined in claims 1, 2 or 3 further characterized in that, immediately after the end of said predetermined period of time, said heat generating resistors are caused by said parallel signal to generate heat sufficient to produce thermal recording.

* * * * *